(12) United States Patent
Lei et al.

(10) Patent No.: US 12,504,479 B2
(45) Date of Patent: Dec. 23, 2025

(54) METHOD FOR ESTIMATING BATTERY CAPACITY BASED ON DYNAMIC FILTER ALGORITHM

(71) Applicant: Beijing Big Moment Technology Co., Ltd, Beijing (CN)

(72) Inventors: Ming Lei, Wuhan (CN); Zhiguo Liu, Sichuan (CN)

(73) Assignee: Beijing Big Moment Technology Co., Ltd., Beijing (CN)

( * ) Notice: Subject to any disclaimer, the term of this patent is extended or adjusted under 35 U.S.C. 154(b) by 53 days.

(21) Appl. No.: 18/222,357

(22) Filed: Jul. 14, 2023

(65) Prior Publication Data

US 2024/0125861 A1 Apr. 18, 2024

(30) Foreign Application Priority Data

Jul. 14, 2022 (CN) .......................... 202210825334.7

(51) Int. Cl.
*G01R 31/388* (2019.01)
*G01R 1/20* (2006.01)
*G01R 19/00* (2006.01)
*G01R 31/367* (2019.01)

(52) U.S. Cl.
CPC .......... *G01R 31/388* (2019.01); *G01R 1/203* (2013.01); *G01R 19/003* (2013.01); *G01R 31/367* (2019.01)

(58) Field of Classification Search
None
See application file for complete search history.

(56) References Cited

U.S. PATENT DOCUMENTS

2022/0413017 A1* 12/2022 Ebner .................. G01R 35/005

* cited by examiner

*Primary Examiner* — Jas A Sanghera

(57) ABSTRACT

A method for estimating battery capacity of a battery, includes: sampling a series of voltages across a sensor resistor coupled to the battery when a current flows through the sensor resistor under conditions of default time and default temperature, and recording the voltages as sample voltages; calculating average filtering voltages by filtering white noise in the sample voltages; calculating median filtering voltages by removing impulse noise in the average filtering voltages; detecting data scope of the median filtering voltages in the data characteristic filed; calculating low-pass filtering voltages by using a low-pass filter formula according to the median filtering voltages domain in the data characteristic filed; and estimating the battery capacity of the battery according to the low-pass filtering voltages.

14 Claims, 7 Drawing Sheets

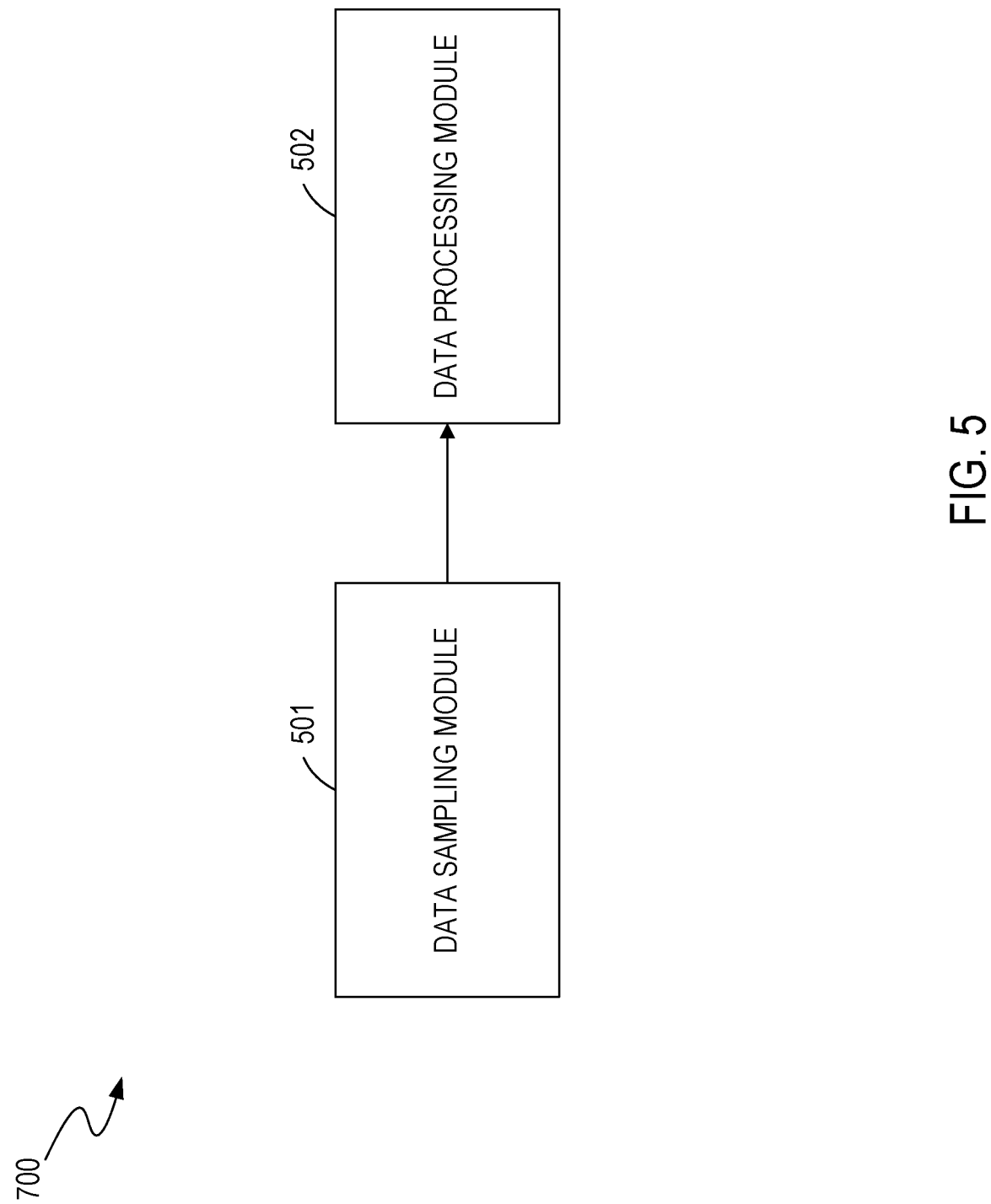

METHOD FOR ESTIMATING BATTERY CAPACITY BASED ON DYNAMIC FILTER ALGORITHM

RELATED APPLICATION

This application claims priority to Chinese Patent Application No. 202210825334.7, titled "Method for Estimating Battery Capacity Based on Dynamic Filter Algorithm", filed on Jul. 14, 2022, with the National Intellectual Property Administration of the People's Republic of China (CNIPA).

BACKGROUND

Batteries are widely used in electronics devices such as mobile phones and electric vehicles. Highly effective battery management system relates to the handling of hotspots and difficulties. The most difficult in battery management systems is how to save the electricity and prolong battery life. Many technicians are concerned by how to improve DC conversion efficiency and ignore the accuracy of the coulometer. Actually, improving the accuracy and stability of estimating battery capacity is also an important way to extend battery lifespan.

Some conventional coulometers for calculating the battery capacity output the data without filter processing. Consequently, the data still contains jitter errors and low current errors. Furthermore, conventional coulometer often filters noises with a constant noise parameter, even though the noise is affected by currents and conditions which will affect stability of the coulometers.

SUMMARY

Embodiments in accordance with the present invention provide method for estimating battery capacity based on a dynamic filter algorithm.

In one embodiment, a method for estimating battery capacity of a battery includes: sampling a series of voltages across a sensor resistor coupled to the battery when a current flows through the sensor resistor under conditions of default time and default temperature, and recording the voltages as sample voltages; calculating average filtering voltages by filtering white noise in the sample voltages; calculating median filtering voltages by removing impulse noise in the average filtering voltages; detecting data scope of the median filtering voltages in the data characteristic field; calculating low-pass filtering voltages by using a low-pass filter formula according to the median filtering voltages domain in the data characteristic field; and estimating the battery capacity of the battery according to the low-pass filtering voltages.

In one embodiment, an apparatus for estimating battery capacity of a battery based on dynamic filter algorithm includes a data sampling module and a data processing module. The data sampling module is configured to sample a series of voltages across a sensor resistor coupled to a battery when a current flows through the sensor resistor under conditions of default time and default temperature, and record the voltages as sample voltages. The data processing module is configured to calculate average filtering voltages by filtering white noise in the sample voltages; calculate median filtering voltages by removing impulse noise in the average filtering voltages; detect data scope of the median filtering voltages in the data characteristic field; calculate low-pass filtering voltages by using a low-pass filter formula according to the median filtering voltages domain in the data characteristic field; and estimate the battery capacity according to the low-pass filtering voltages.

In one embodiment, a non-transitory computer storage medium storing a computer program, wherein when the computer program is executed by a processor, the method for estimating battery capacity of a battery is implemented.

In another embodiment, a terminal, comprises a memory and a processor, wherein a computer program is stored in the memory; wherein the processor is configured to execute the computer program in the memory; when the computer program is executed by the processer, the method for estimating battery capacity of a battery is implemented.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

FIG. 5 shows a structural block diagram of an apparatus for estimating battery capacity of a battery based on dynamic filter algorithm, in accordance with embodiments of the present invention.

DETAILED DESCRIPTION

Reference will now be made in detail to the embodiments of the present invention. While the invention will be described in combination with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail to avoid obscuring aspects of the present invention.

Figure 1:
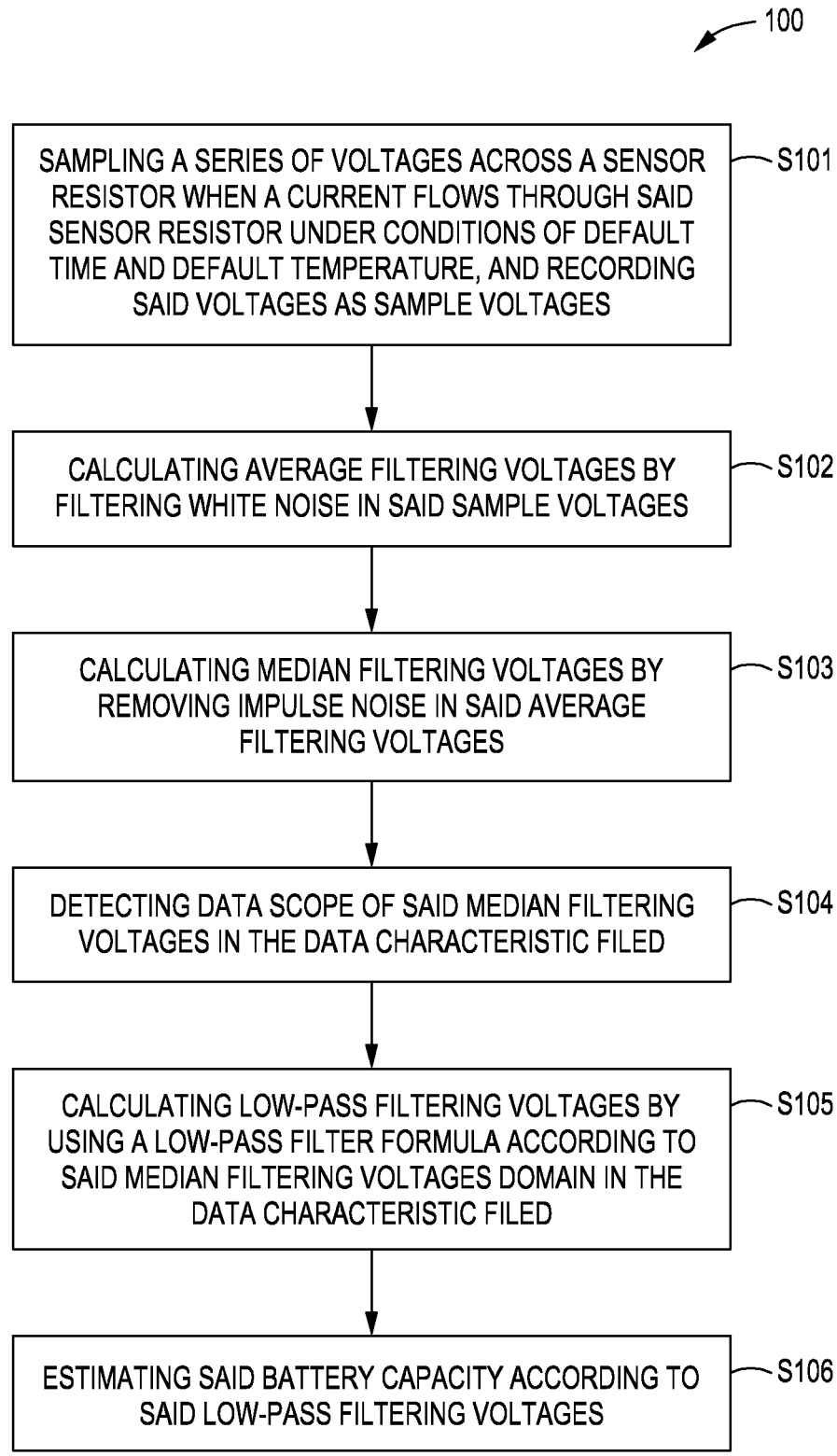
FIG. 1 shows a flowchart of a method for estimating battery capacity of a battery based on dynamic filter algorithm, in accordance with embodiments of the present invention.

FIG. 1 shows a flowchart of a method for estimating battery capacity of a battery based on dynamic filter algorithm, in accordance with embodiments of the present invention. Although specifics steps are disclosed in FIG. 1, these steps are only examples. That is, the present invention is well suited to performing various other steps or variations of the steps recited in FIG. 1.

In one embodiment, a sensor resistor coupled to a battery, is used to calculate the battery capacity of the battery. In step S101: a series of voltages are sampled across the sensor resistor when a current flows through the sensor resistor under conditions of default time and default temperature. The voltages are recorded as sample voltages. At the same time, the data related to the sample voltage is recorded, including the theoretical values of temperature, current, sampling frequency, and the actual measured voltage of the sensor resistor. The temperature of the battery will vary with other factors such as usage time in actual applications. The sample voltages used for algorithm simulation in this embodiment of the invention are sampled at normal atmospheric temperature, and the default current includes small current and large current, with a value range of 0-10 A. In one embodiment, sampling frequency fs equals to 4 HZ, it means that coulometer samples four sample voltages in one second, and will get fs*t numbers of sample voltages during t seconds. Sample voltage $x_i$ represents voltage of the sensor resistor at time of i/fs. To simplify the description, the sample voltage $x_i$ at time i in the following text actually refers to the sample voltage at the time of i/fs.

In step S102: average filtering voltages are calculated by filtering white noise in the sample voltages. Specifically, the average filtering voltages are obtained in accordance with the following formula (1):

$$x\_mean(i) = \frac{1}{N_{mean}} \sum_{i-(N_{mean}-1)}^{i} x_i \qquad (1)$$

in which i is a sampling time, $x_i$ is a sample voltage at time i, x_mean(i) is an average filtering voltage at time i, $N_{mean}$ is a mean filtering window, if $i<N_{mean}$, $x\_mean(i)=x_i$.

As the average value of the white noise is zero, the white noise can be removed by calculating average filtering voltages with a mean filtering window $N_{mean}$. For example, if the sample voltages are $x_1, \ldots, x_{i-2}, x_{i-1}$ and $x_i$, and $N_{mean}$ equals to three, x_mean(i) equals to an average voltage of sample voltage $x_{i-2}, x_{i-1}$ and $x_i$. The range values of $N_{mean}$ is relative to the type of the battery, and can be determined according to the results tested from several sample voltages. In one embodiment, the optimal value of the mean filtering window $N_{mean}$ equals to three after testing twenty sets of sample voltages in present invention.

In step S103: median filtering voltages are calculated by removing impulse noise in the average filtering voltages, wherein the median filtering voltages are obtained in accordance with the following formula (2):

$$x\_med(i)=medfilt1(x\_mean(i), N_{med}) \qquad (2)$$

in which symbol "medfilt1" represents binary search algorithm; and $N_{med}$ is a median filtering window, represents the numbers of said average filtering voltages, x_med(i) represents a median filtering voltage at time i.

Specifically, the median filtering voltages are calculated by removing impulse noise in the average filtering voltages with a median filtering window $N_{med}$. For example, if the average filtering voltages are x_mean(1) . . . x_mean(i−3), x_mean(i−2), x_mean(i−1) and x_mean(i), and i is greater than or equal to 5, the median filtering voltage x_med(i) at time of i is a median value of a set of average filtering voltages x_mean(1) . . . x_mean(i−3), x_mean(i−2), x_mean (i−1) and x_mean(i). Well known methods are used for calculating a median of a set of data. In this embodiment, the optimal value of the median filtering window $N_{med}$ equals to fifteen after testing twenty sets of sample voltages in present invention.

In step S104, the data scope of the median filtering voltages in the data characteristic field is detected. There are four data characteristics fields in present embodiment, that is tiny inhibitory scope, small data filter scope, big data filter scope and interrupt response scope. In one embodiment, the sensor resistor is a light load, for example, 1 mΩ sensor resistor. Technicians in the field should be understood that the load here is not limited to 1 mΩ, and cannot be regarded as a limitation of the present invention.

In step S105: low-pass filtering voltages are calculated by using a low-pass filter formula according to the data scope of the median filtering voltages in the data characteristic field. Specifically, when a deviation of the voltage across the sensor resistor is less than or equal to a predetermined deviation, the low-pass filtering voltages are obtained in accordance with a first order low pass filter formula (3) as below:

$$x_{filter}(i)=(1-\text{ratio})*x_{med}(i)+\text{ratio}*x_{filter}(i-1) \qquad (3)$$

in which ratio is a threshold of low-pass filter, $x_{filter}(i)$ is a low-pass filtering voltage at time i, wherein $x_{filter}(1)=x_{med}(1)$.

Specifically, when the difference between the adjacent median filtering voltages is in the tiny inhibitory scope, that is, the difference between x_med(i) and x_med(i−1), then the threshold of low-pass filter ratio equals to 1. When the difference between the adjacent median filtering voltages is in the small data filter scope, then the threshold of low-pass filter ratio is greater than 0.95 and less than 0.99. When the difference between the adjacent median filtering voltages is in the big data filter scope, then the threshold of low-pass filter ratio is greater than 0.75 and less than 0.95. When the difference between the adjacent median filtering voltages is in the interrupt response scope, then the threshold of low-pass filter ratio equals to zero. Further, if the deviation of the voltage across the sensor resistor is greater than the predetermined deviation, the low-pass filtering voltages are obtained in accordance with a second order low pass filter formula (4) as below:

$$x_{filter}(i)=(1-\text{ratio1}-\text{ratio2})*x_{med}(i)+\text{ratio1}*x_{filter}(i-1)+\text{ratio2}*x_{filter}(i-2) \qquad (4)$$

in which ratio1 and ratio2 are thresholds of low-pass filter, are set based dynamic assignment, wherein $x_{filter}(1)=x_{med}(1)$, $x_{filter}(2)=x_{med}(2)$.

In one embodiment, when the difference between the adjacent median filtering voltage is in the tiny inhibitory scope, that is, the difference between x_med(i) and x_med (i−1), then the threshold of low-pass filter ratio1 equals to 1 and ratio2 equals to 0; when the difference between the adjacent median filtering voltages is in the small data filter scope, then the threshold of low-pass filter ratio1 is greater than 0.9 and less than 0.95, and ratio2 is greater than 0.04 and less than 0.09; when the difference between the adjacent median filtering voltages is in the big data filter scope, then the threshold of low-pass filter ratio1 is greater than 0.7 and less than 0.9, and ratio2 is greater than 0.05 and less than 0.1; and when the difference between the adjacent median filtering voltage is in the interrupt response scope, then the threshold of low-pass filter ratio1 equals to zero, and ratio2 equals to zero too.

The thresholds of low-pass filter ratio, ratio1 and ratio2 are negative correlation with the difference between xmed(i) and xfilter(i−1). The greater the difference between xmed(i) and xfilter(i−1), the smaller the values of ratio, ratio1 and ratio2.

In one embodiment, a first order low pass filter is preferred when the accuracy of estimating the battery capacity of the battery via the first order low pass filter formula (3) is enough, otherwise, a second order low pass filter formula (4) is selected. Also, the first order low pass filter and the second order low pass filter in present invention are described as a dynamic filter algorithm.

In step S106: the battery capacity of the battery is estimated in accordance with the following formula (5):

$$Ah_i = Ah_{i-1} + \frac{x_{filter}(i)}{R} * t \quad (5)$$

in which $Ah_i$ represents battery capacity of the battery at time i, R represents resistance of the sensor resistor, t represents a sampling duration, $Ah_0$ represents an initial value of the battery capacity.

Combined with error indicators of calculating the battery capacity of the battery provided by mobile phone manufacturer, the current error would not exceed 3 mA if a current less than 1 A flows through the sensor resistor and would not exceed 0.5 percent of the current flowing through when the current is more than 1 A. Take an example of a current of 10 A flows through a 1 mΩ sensor resistor, median filtering voltages of the sample voltages sampled every 250 ms and every 1 s respectively are listed in table 1 as below:

TABLE 1

| A time | B standard voltage | C actual measured voltage | D ADC_250mS | E ADC_1S |
|---|---|---|---|---|
| 12-52-30 | −10 mV | −10.003 mV | 63260 | 63260 |
| 12-52-35 | −10 mV | −10.003 mV | 63260 | 63261 |
| 12-52-39 | −10 mV | −10.003 mV | 63260 | 63260 |
| 12-52-43 | −10 mV | −10.003 mV | 63259 | 63259 |

As shown in table 1, the column D in table 1 records the median filtering voltages of the sensor resistor sampled every 250 ms by Analog-to-Digital Converter (ADC), and the column E in table 1 records the median filtering voltages of the sensor resistor sampled every 1 s by ADC. When the difference between the adjacent median filtering voltages is less than or equal to 1LSB (Least Significant Bit), the difference between the adjacent median filtering voltage is in a tiny inhibitory scope. However, the difference between the adjacent median filtering voltage is in a small data filter scope when the difference is greater than 1lsb and less than or equal to 3LSB; and is in a big data filter scope when the difference is greater than 3lsb and less than or equal to 6LSB, and is an interrupt response scope when the difference is greater than 6LSB, wherein 1LSB equals to 144/(2^15−1) mV.

As shown in table 1, the median filtering voltages of the sensor resistor listed in column D and column E indicate analog voltages, take digital voltage 63260 as an example, it represents an analog voltage (2^16−63260)*(144/(2^15−1), and equals to 10.0022584 mV.

Figure 2:
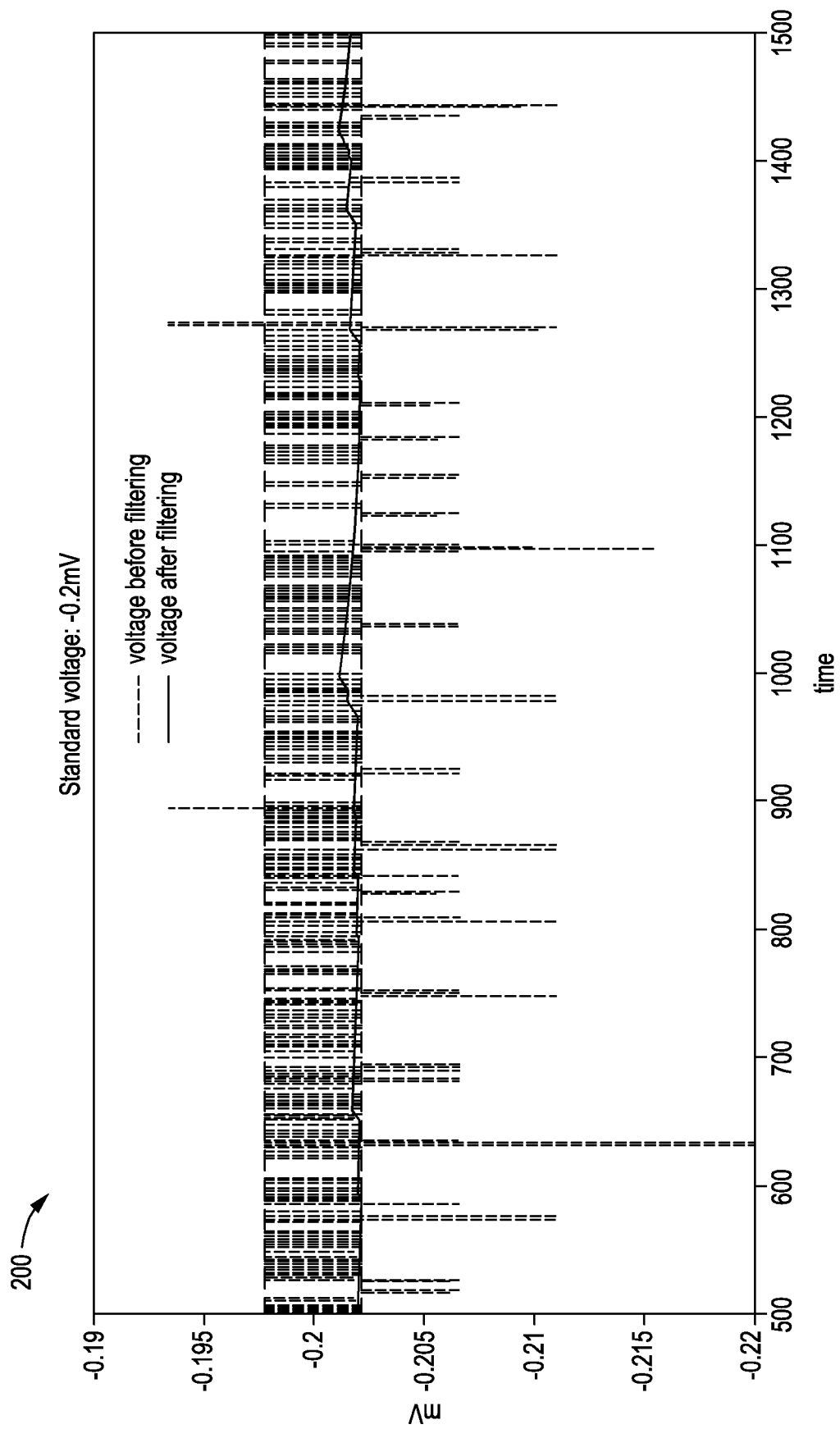
FIG. 2 shows a part of a plot of voltage across a sensor resistor when a current of −0.2 A flows through the sensor resistor before and after filtering, in accordance with embodiments of the present invention.

FIG. 2 shows a part of a plot of voltage across a sensor resistor when a current of −0.2 A flows through the sensor resistor before and after filtering, in accordance with embodiments of the present invention. As shown in FIG. 2, the horizontal axis represents the number of sample voltage, and the vertical axis represents the sample voltages of the sensor resistor. Wherein the dashed line represents the original sample voltages before filtering, while the solid line represents the voltages after filtering according to the present invention. In FIG. 2, the resistance of the sensor resistor is 1 mΩ, the sampling frequency fs equals to 4 Hz, the number shown on the horizontal axis represents the numbers of the sample voltages, for example, 120 represents the 120th sample voltage which is sampled in 30th second. As shown in FIG. 2, the voltage after filtering is more stable than the original sample voltage, in accordance with embodiments of the present invention.

In one embodiment, there are four groups of comparison of standard deviation of sample voltages before and after filtering, in which corresponding to four groups of current flowing through a sensor resistor of 1 mΩ as below: −0.5 A, −0.2 A, 0.2 A and 0.5 A respectively, and the value of standard deviation of sample voltages after filtering indicates if the value of the sample voltage is more accurate, the smaller the standard deviation, the more accurate the sample voltages, and then the more accurate the value of the battery capacity. Minus sign "-" means that the battery is in the discharging state. In this embodiment, the average voltage x of the sample voltages $x_1, \ldots, x_{i-2}, x_{i-1}, x_i \ldots$ and $x_n$ is calculated in accordance with the following formula (6):

$$\bar{x} = \frac{x_1 + x_2 + \ldots + x_n}{n} \quad (6)$$

The standard deviation of sample voltages $x_1, \ldots, x_{i-2}, x_{i-1}, x_i \ldots$ and $x_n$ is calculated in accordance with the following formula (7):

$$s = \sqrt{\frac{(x_1 - \bar{x})^2 + \ldots + (x_n - \bar{x})^2}{n}} \quad (7)$$

To simplify the description, the sample voltages $x_1, \ldots, x_{i-2}, x_{i-1}, x_i \ldots$ and $x_n$ are not shown in table 2, the standard deviation of sample voltages before and after filtering are listed directly.

TABLE 2

| | standard voltage | | | |
|---|---|---|---|---|
| | −0.5 mV | −0.2 mV | 0.2 mV | 0.5 mV |
| standard deviation of sample voltages before filtering (part) | 0.0027 mV | 0.0026 mV | 0.0049 mV | 0.0047 mV |
| standard deviation of sample voltages after filtering (part) | 0.0004 mV | 0.0002 mV | 0.0007 mV | 0.0006 mV |

As shown in table 2, when a current of −0.5 A flows through a sensor resistor of 1 mΩ, the standard deviation of sample voltages after filtering is 14.8 percent of the standard deviation of sample voltages before filtering. When a current of −0.2 A flows through a sensor resistor of 1 mΩ, the standard deviation of sample voltages after filtering is 7.7 percent of the standard deviation of sample voltages before filtering. When a current of 0.2 A flows through a sensor resistor of 1 mΩ, the standard deviation of sample voltages after filtering is 14.3 percent of the standard deviation of sample voltage before filtering. When a current of 0.5 A flows through a sensor resistor of 1 mΩ, the standard deviation of sample voltage after filtering is 12.8 percent of the standard deviation of sample voltage before filtering. The standard deviation of sample voltages indicates the accurate of the sample voltages; the smaller the standard deviation, the more accurate the value of the battery capacity.

Figure 3A:
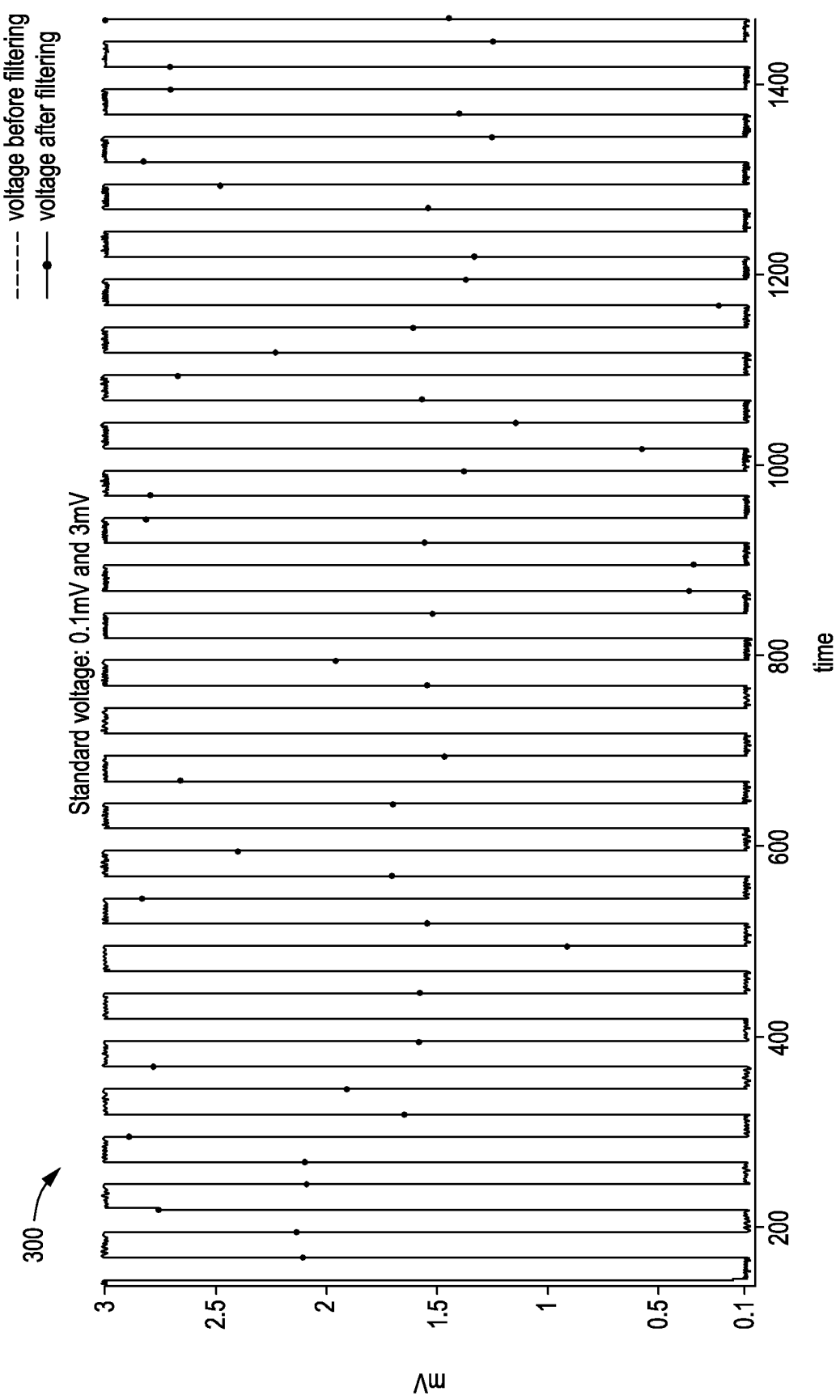
FIG. 3A shows a part of a plot of voltage across a sensor resistor when a current of 0.1 A and 3 A flow through the sensor resistor before and after filtering, wherein the current hops every five seconds, in accordance with embodiments of the present invention.
Figure 3B:
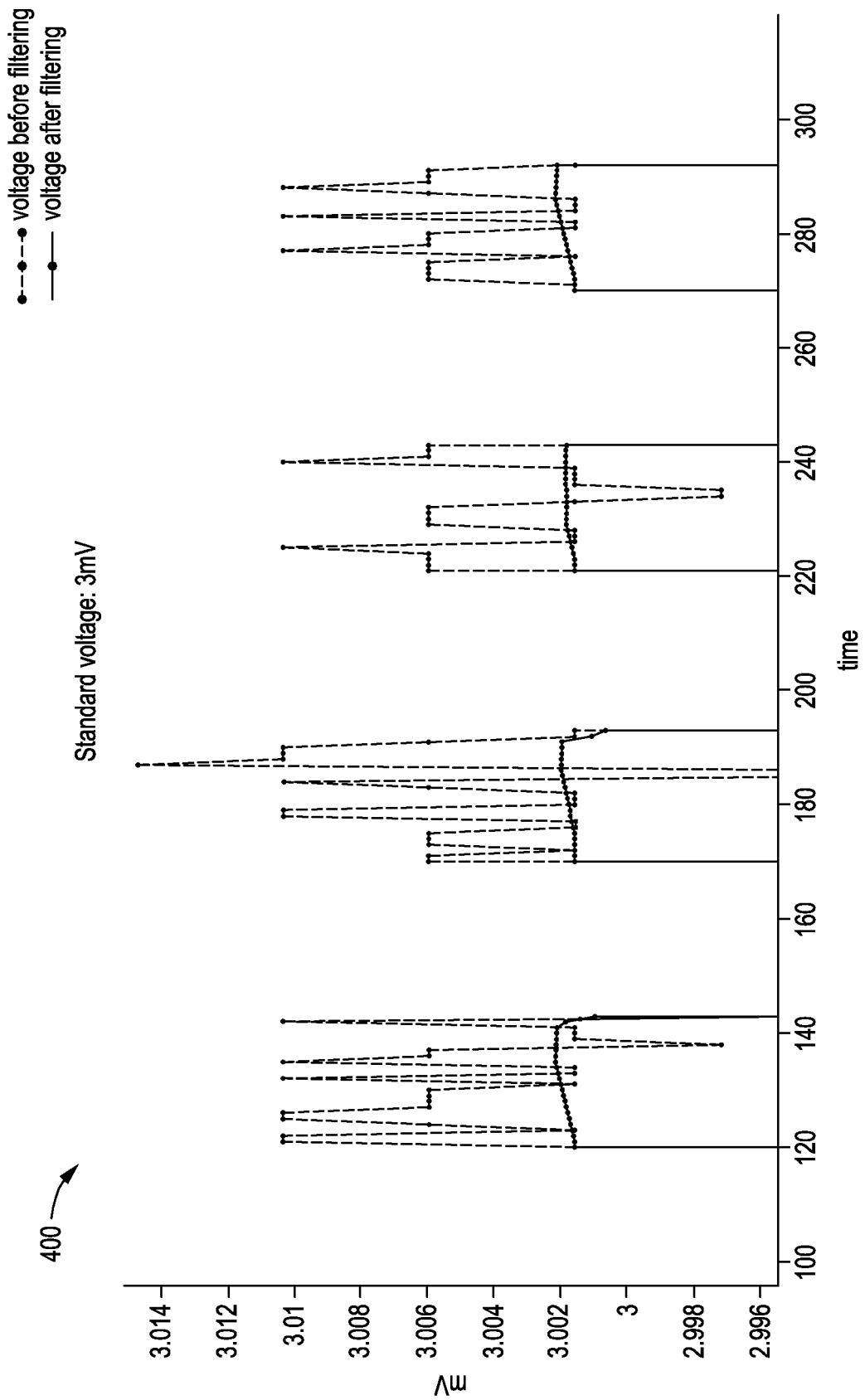
FIG. 3B shows a part of a plot of voltage across a sensor resistor when a current of 3 A flows through the sensor resistor before and after filtering, in accordance with embodiments of the present invention.
Figure 3C:
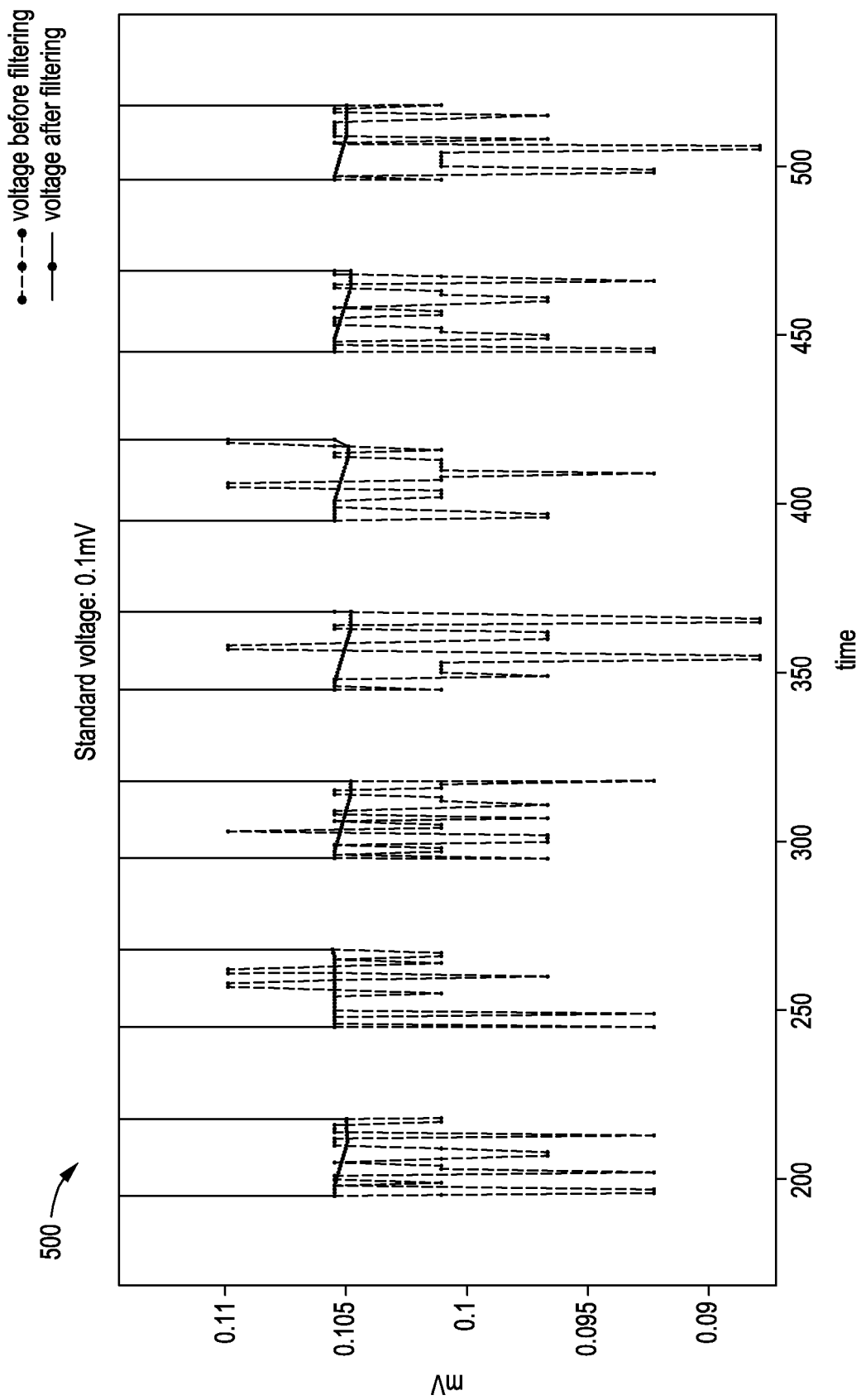
FIG. 3C shows a part of a plot of voltage across a sensor resistor when a current of 0.1 A flows through the sensor resistor before and after filtering, in accordance with embodiments of the present invention.

FIG. 3A shows a part of a plot of voltage across a sensor resistor when a current of 0.1 A and 3 A flow through the sensor resistor respectively before and after filtering, wherein the current hops every five seconds, in accordance with embodiments of the present invention. FIG. 3B shows detailed plot of voltage across a sensor resistor when a current of 3 A flows through the sensor resistor, and FIG. 3C shows detailed plot of voltage across a sensor resistor when a current of 0.1 A flows through the sensor resistor. As shown in FIG. 3A, FIG. 3B and FIG. 3C, the horizontal axis represents the number of sample voltages, and the vertical axis represents the sample voltages of the sensor resistor. Wherein the dashed line represents the original sample voltages before filtering, while the solid line represents the sample voltages after filtering according to the present invention, and the number shown on the horizontal axis represents the number of the sample voltages. In this embodiment, the resistance of the sensor resistor is 1 mΩ, and the sampling frequency fs equals to 4 Hz. As shown in FIG. 3B and FIG. 3C, the voltage after filtering is more stable than the original sample voltage, in accordance with embodiments of the present invention.

Furthermore, four groups of standard deviation of sample voltages (part) in corresponding to four different hopping cycle as follows: a 5 s hopping cycle, a 10 s hopping cycle, a 20 s hopping cycle and a 30 s hopping cycle are disclosed, in which the current flowing through the sensor resistor hops from 0.1 A to 3 A. To simplify the description, the sample voltages $x_1, \ldots, x_{i-2}, x_{i-1}, x_i \ldots$ and $x_n$ are not shown in table 3, the standard deviation of sample voltages before and after filtering are listed directly as below:

TABLE 3

| hopping cycle | 5 s | | 10 s | | 20 s | | 30 s | |
|---|---|---|---|---|---|---|---|---|
| standard voltage | 0.1 mV | 3 mV | 0.1 mV | 3 mV | 0.1 mV | 3 mV | 0.1 mV | 3 mV |
| standard deviation of sample voltages before filtering (part) | 0.0051 mV | 0.0051 mV | 0.0049 mV | 0.0049 mV | 0.0051 mV | 0.0048 mV | 0.0050 mV | 0.0045 mV |
| standard deviation of sample voltages after filtering (part) | 0.0011 mV | 0.0007 mV | 0.0004 mV | 0.0004 mV | 0.0012 mV | 0.0007 mV | 0.0006 mV | 0.0011 mV |

As disclosed in table 3, the standard deviation of sample voltages after filtering is much smaller than the standard deviation of sample voltages before filtering. The standard deviation of sample voltages indicates the accurate of the sample voltages, the smaller the standard deviation, the more accurate the value of the battery capacity.

Figure 4:
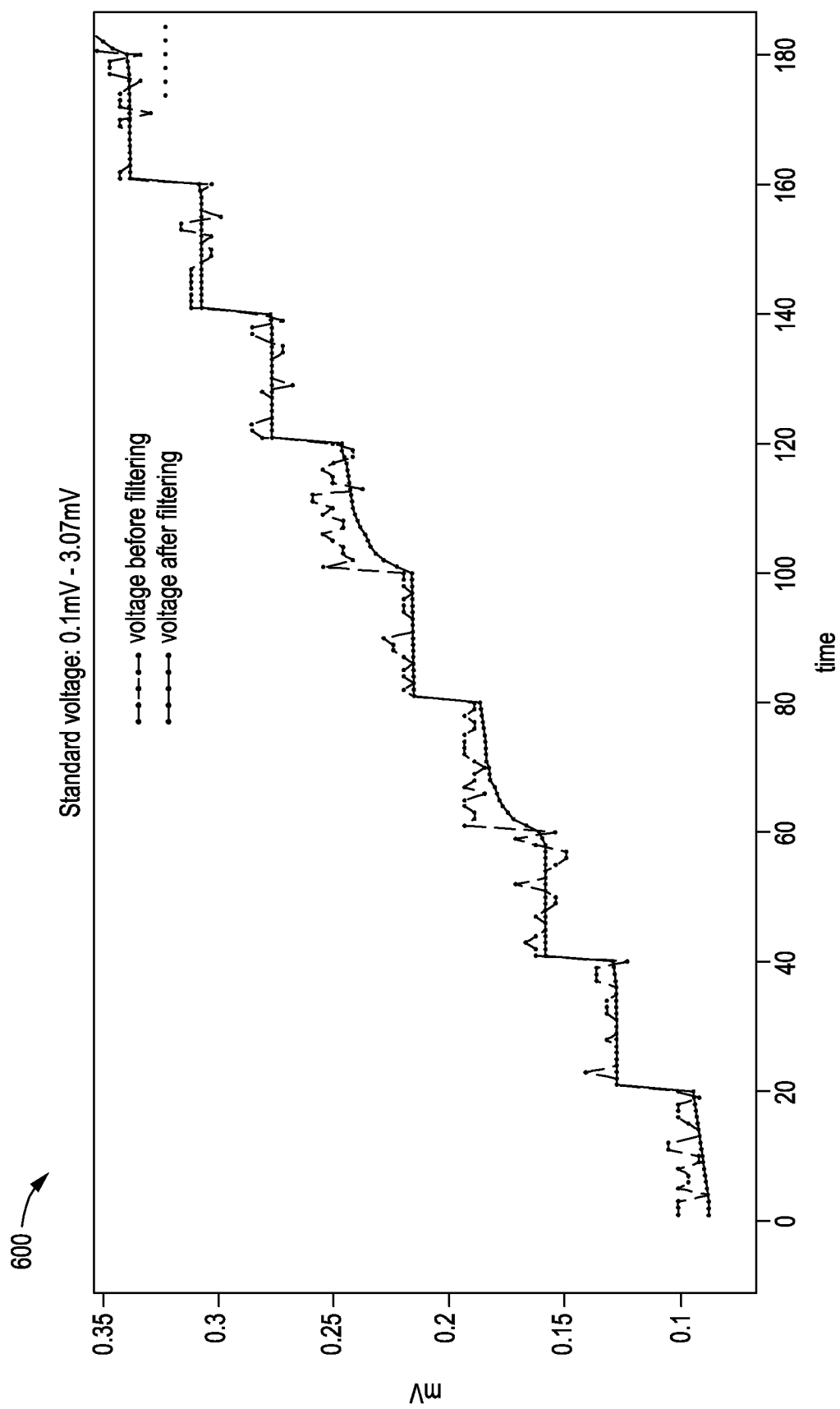
FIG. 4 shows a part of a plot of voltage across a sensor resistor when a current between 0.1 A to 3.07 A flows through the sensor resistor before and after filtering, in which the current increases from 0.1 A to 3.07 A with a 0.03 A current increase every five seconds, in accordance with embodiments of the present invention.

FIG. 4 shows a part of a plot of voltage across a sensor resistor when a current between 0.1 A to 3.07 A flows through the sensor resistor before and after filtering, in which the current increases from 0.1 A to 3.07 A with a 0.03 A current increase every five seconds, in accordance with embodiments of the present invention. As shown in FIG. 4, the horizontal axis represents the number of sample voltages, and the vertical axis represents the sample voltages of the sensor resistor. The dashed line represents the original sample voltages before filtering, while the solid line represents the voltages after filtering according to the present invention, and the number shown on the horizontal axis represents the numbers of the sample voltages. In this embodiment, the resistance of the sensor resistor is 1 mΩ, and the sampling frequency fs equals to 4 Hz. As shown in FIG. 4, the voltage after filtering is more stable than the original sample voltage, in accordance with embodiments of the present invention.

Furthermore, four groups of standard deviation of sample voltages (part) in corresponding to four different currents as follows: 0.15 A, 1.17 A, 2.16 A and 2.97 A are disclosed as an example, in which the current flowing through the sensor resistor hops every five seconds. To simplify the description, the sample voltages $x_1, \ldots, x_{i-2}, x_{i-1}, x_i \ldots$ and $x_n$ are not shown in table 4, the standard deviation of sample voltages before and after filtering are listed directly as below:

TABLE 4

| | hopping cycle the current increases 0.03 A every five seconds standard voltage | | | |
|---|---|---|---|---|
| | 0.15 mV | 1.17 mV | 2.16 mV | 2.97 mV |
| standard deviation of sample voltages before filtering (part) | 0.0100 mV | 0.0056 mV | 0.0095 mV | 0.0054 mV |
| standard deviation of sample voltages after filtering (part) | 0.0019 mV | 2.3220e−04 mV | 3.5831e−04 mV | 5.8187e−04 mV |

As disclosed in table 4, the standard deviation of sample voltages after filtering is much smaller than the standard deviation of sample voltages before filtering. The standard deviation of sample voltages indicates the accurate of the sample voltages, the smaller the standard deviation, the more accurate the value of the battery capacity.

FIG. 5 shows a structural block diagram of an apparatus for estimating battery capacity of a battery based on dynamic filter algorithm, in accordance with embodiments of the present invention. FIG. 5 will be described in combine with FIG. 1. As shown in FIG. 5, the apparatus includes a data sampling module 501 and a data processing module 502, herein, the data processing module 502 can be a processor.

The data sampling module 501 is configured to sample a series of voltages across a sensor resistor coupled to a battery when a current flows through the sensor resistor under conditions of default time and default temperature, and record the voltages as sample voltages.

The data processing module 502 is configured to calculate average filtering voltages by filtering white noise in the sample voltages; calculate median filtering voltages by removing impulse noise in the average filtering voltages; detect data scope of the median filtering voltages in the data characteristic field; calculate low-pass filtering voltages by using a low-pass filter formula according to the median filtering voltages domain in the data characteristic field; and estimate the battery capacity according to the low-pass filtering voltages. Step S101 in FIG. 1 is performed by the data sampling module 501, and Steps S102-S106 are performed by the data processing module 502.

In an embodiment of the present application, a computer program is stored in the computer storage medium, wherein when the computer program is executed by the data processing module 502, the above method for estimating battery capacity of a battery based on dynamic filter algorithm is implemented, for example steps S102-S106 in FIG. 1.

In an embodiment of the present application, a terminal is further provided, which includes a memory and a processor, wherein a computer program is stored in the memory; the processor is configured to execute the computer program in the memory; and when the computer program is executed by the processor, the method for estimating battery capacity of a battery based on dynamic filter algorithm as described above is implemented, for example steps S102-S106 in FIG. 1.

As disclosed above, the method of estimating the battery capacity of the battery via low pass filter in present invention can improves the accuracy of the sample voltages, and thereby improves the accuracy of estimating the battery capacity of the battery. Furthermore, the battery lifespan can be prolonged as the improvement of the accuracy and stability of estimating the battery capacity.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

The invention claimed is:

1. A method for estimating battery capacity of a battery, said method comprising:
sampling a series of voltages across a sensor resistor coupled to said battery when a current flows through said sensor resistor under conditions of default time and default temperature, and recording said voltages as sample voltages;
calculating average filtering voltages by filtering white noise in said sample voltages;
calculating median filtering voltages by removing impulse noise in said average filtering voltages;
detecting data scope of said median filtering voltages in a data characteristic field;
calculating low-pass filtering voltages by using a low-pass filter formula according to said median filtering voltages domain in the data characteristic field; and
estimating said battery capacity according to said low-pass filtering voltages.

2. The method of claim 1, wherein said average filtering voltages are calculated in accordance with the following formula:

$$x\_mean(i) = \frac{1}{N_{mean}} \sum_{i-(N_{mean}-1)}^{i} x_i \quad (1)$$

in which i is a sampling time, $x_i$ is a sample voltage at time i, x_mean(i) is an average filtering voltage at time i, $N_{mean}$ is a mean filtering window, if $i<N_{mean}$, x_mean(i)=$x_i$.

3. The method of claim 2, wherein said median filtering voltages are calculated in accordance with the following formula:

$$x\_med(i) = \text{medfilt1}(x\_mean(i), N_{med}) \quad (2)$$

in which symbol "medfilt1" represents binary search algorithm; and $N_{med}$ is a median filtering window, represents the numbers of said average filtering voltages; x_med(i) represents a median filtering voltage at time i.

4. The method of claim 3, wherein when a deviation of said voltage across said sensor resistor is less than a predetermined deviation, said low-pass filtering voltages are calculated in accordance with the following formula:

$$x_{filter}(i) = (1-\text{ratio})*x_{med}(i) + \text{ratio}*x_{filter}(i-1) \quad (3)$$

in which ratio is a threshold of low-pass filter, $x_{filter}(i)$ is a low-pass filtering voltage at time i, wherein $x_{filter}(1) = x_{med}(1)$.

5. The method of claim 4, wherein said data scope comprises a tiny inhibitory scope, and wherein if the difference between $x_{med}(i)$ and $x_{med}(i-1)$ is in said tiny inhibitory scope, then said threshold of low-pass filter ratio equals to 1.

6. The method of claim 4, wherein said data scope comprises a small data filter scope, and wherein if the difference between $x_{med}(i)$ and $x_{med}(i-1)$ is in said small data filter scope, then said threshold of low-pass filter ratio is greater than 0.95 and less than 0.99.

7. The method of claim 4, wherein said data scope comprises a big data filter scope, and wherein if the difference between $x_{med}(i)$ and $x_{med}(i-1)$ is in said big data filter scope, then said threshold of low-pass filter ratio is greater than 0.75 and less than 0.95.

8. The method of claim 4, wherein said data scope comprises an interrupt response scope, and wherein if the difference between $x_{med}(i)$ and $x_{med}(i-1)$ is in said interrupt response scope, then said threshold of low-pass filter ratio equals to zero.

9. The method of claim 3, wherein said data scope comprises an inhibitory scope, a first data filter scope, a second data filter scope, and an interrupt response scope, wherein a value in said first data filter scope is greater than a maximum value of said inhibitory scope, a value in said second data filter scope is greater than a maximum value of said first data filter scope, and a value in said interrupt response scope is greater than a maximum value of said second data filter scope, and wherein when a deviation of said voltage across said sensor resistor is greater than a predetermined deviation, said low-pass filtering voltages are calculated in accordance with the following formula:

$$x_{filter}(i) = (1-\text{ratio1}-\text{ratio2})*x_{med}(i) + \text{ratio1}*x_{filter}(i-1) + \text{ratio2}*x_{filter}(i-2) \quad (4)$$

in which ratio1 and ratio2 are thresholds of low-pass filter, are set based dynamic assignment, wherein $x_{filter}(1) = x_{med}(1)$, $x_{filter}(2) = x_{med}(2)$, if the difference between $x_{med}(i)$ and $x_{med}(i-1)$ is in said inhibitory scope, then said threshold of low-pass filter ratio1 equals to 1 and ratio2 equals to 0; if the difference between $x_{med}(i)$ and $x_{med}(i-1)$ is in said first data filter scope, then said threshold of low-pass filter ratio1 is greater than 0.9 and less than 0.95, and ratio2 is greater than 0.04 and less than 0.09; if the difference between $x_{med}(i)$ and $x_{med}(i-1)$ is in said second data filter scope, then said threshold of low-pass filter ratio1 is greater than 0.7 and less than 0.9, and ratio2 is greater than 0.05 and less than 0.1; and if the difference between $x_{med}(i)$ and $x_{med}(i-1)$ is in said interrupt response scope, then said threshold of low-pass filter ratio1 equals to zero, and ratio2 equals to zero.

10. The method of claim 4 or claim 9, wherein the current battery capacity of said battery is estimated in accordance with the following formula:

$$Ah_i = Ah_{i-1} + \frac{x_{filter}(i)}{R} * t \quad (5)$$

in which $Ah_i$ represents the battery capacity of said battery at time i, R represents resistance of said sensor resistor, t represents sampling time, $Ah_0$ represents an initial value of said battery capacity.

11. An apparatus for estimating battery capacity of a battery, comprising a data sampling module and a data processing module, wherein said data sampling module is coupled to said data processing module; wherein said data sampling module is configured to sample a series of voltages across a sensor resistor coupled to said battery when a current flows through said sensor resistor under conditions of default time and default temperature, and recording said voltages as sample voltages, and said data processing module is caused to perform following steps:
  calculating average filtering voltages by filtering white noise in said sample voltages;
  calculating median filtering voltages by removing impulse noise in said average filtering voltages;
  detecting data scope of said median filtering voltages in a data characteristic field;
  calculating low-pass filtering voltages by using a low-pass filter formula according to said median filtering voltages domain in the data characteristic field; and
  estimating said battery capacity according to said low-pass filtering voltages.

12. The apparatus of claim 11, wherein said data processing module is configured to
  estimate the current battery capacity of said battery in accordance with the following formula:

$$Ah_i = Ah_{i-1} + \frac{x_{filter}(i)}{R} * t$$

in which $Ah_i$ represents the battery capacity of said battery at time i, $x_{filter}(i)$ a low-pass filtering voltage at time i, R represents resistance of said sensor resistor, t represents sampling time, $Ah_0$ represents an initial value of said battery capacity.

13. A non-transitory computer storage medium storing a computer program, wherein when the computer program is executed by a processor, the method for estimating battery capacity of a battery according to claim 1 is implemented.

14. A terminal, comprising a memory and a processor, wherein a computer program is stored in said memory; wherein said processor is configured to execute the computer program in the memory; when the computer program is executed by said processer, the method for estimating battery capacity of a battery according to claim 1 is implemented.

* * * * *